(12) United States Patent
Wabnitz et al.

(10) Patent No.: US 7,902,386 B2
(45) Date of Patent: Mar. 8, 2011

(54) METHOD FOR THE DEPOLYMERIZATION OF MIXTURES THAT CONTAIN MONO-AND/OR DIESTERS OF POLYTETRAHYDROFURANE

(75) Inventors: Tobias Wabnitz, Mannheim (DE); Ricardo Ferre Gimenez, Neustadt (DE); Robert Laubner, Mutterstadt (DE); Ralf Stolle, Lampertheim (DE)

(73) Assignee: BASF SE, Ludwigshafen (DE)

( * ) Notice: Subject to any disclaimer, the term of this patent is extended or adjusted under 35 U.S.C. 154(b) by 172 days.

(21) Appl. No.: 12/446,159

(22) PCT Filed: Aug. 27, 2008

(86) PCT No.: PCT/EP2008/061237
§ 371 (c)(1),
(2), (4) Date: Apr. 17, 2009

(87) PCT Pub. No.: WO2009/030619
PCT Pub. Date: Mar. 12, 2009

(65) Prior Publication Data
US 2010/0298583 A1    Nov. 25, 2010

(30) Foreign Application Priority Data

Sep. 6, 2007  (EP) .................................. 07115807

(51) Int. Cl.
*C07D 307/08* (2006.01)
(52) U.S. Cl. ........................................ 549/508
(58) Field of Classification Search .................. 549/508
See application file for complete search history.

(56) References Cited

U.S. PATENT DOCUMENTS

| 3,433,829 | A | 3/1969 | Dörfelt et al. |
| 4,120,903 | A | 10/1978 | Pruckmayr et al. |
| 4,189,566 | A | 2/1980 | Mueller et al. |
| 5,208,385 | A | 5/1993 | Kahn et al. |
| 5,268,345 | A | 12/1993 | Mueller |
| 5,641,857 | A | 6/1997 | Dostalek et al. |
| 5,886,138 | A | 3/1999 | Muller |
| 6,207,793 | B1 | 3/2001 | Kim |
| 6,271,413 | B1 | 8/2001 | Muller |
| 6,359,108 | B1 | 3/2002 | Eller et al. |
| 6,429,321 | B1 | 8/2002 | Lin et al. |
| 6,455,711 | B1 | 9/2002 | Eller et al. |

FOREIGN PATENT DOCUMENTS

| DE | 1226560 | 10/1966 |
| DE | 2801578 A1 | 7/1979 |
| DE | 4316138 | 11/1994 |
| DE | 19513493 | 3/1996 |
| EP | 0038009 | 10/1981 |
| EP | 0535515 A1 | 4/1993 |
| JP | 04306228 | 10/1992 |
| JP | 11269262 | 10/1999 |
| WO | WO-9405719 | 3/1994 |
| WO | WO-9623833 | 8/1996 |
| WO | WO-9851729 | 11/1998 |
| WO | WO-9912992 | 3/1999 |
| WO | WO-2007141148 | 12/2007 |

OTHER PUBLICATIONS

The International Preliminary Report on Patentability issued in related International Application No. PCT/EP2008/061237 and its English language translation.
International Search Report of International Application No. PCT/EP2008/061237 dated Nov. 6, 2008.

*Primary Examiner* — Bernard Dentz
(74) *Attorney, Agent, or Firm* — Connolly Bove Lodge & Hutz LLP

(57) ABSTRACT

The present invention provides a process for depolymerizing mixtures comprising mono- and/or diesters of polytetrahydrofuran in the presence of an acidic catalyst and of a $C_1$- to $C_3$-alcohol at temperatures of from 80 to 200° C. and a pressure of from 0.05 to 0.5 MPa, where the molar ratio of the $C_1$- to $C_3$-alcohol relative to the carboxyl groups present in the mixture is greater than 1.

20 Claims, No Drawings

METHOD FOR THE DEPOLYMERIZATION OF MIXTURES THAT CONTAIN MONO-AND/OR DIESTERS OF POLYTETRAHYDROFURANE

CROSS REFERENCE TO RELATED APPLICATIONS

This application is a National Stage of PCT/EP2008/061237 filed Aug. 27, 2008 which in turn claims priority from European Application 07115807.5 filed Sep. 6, 2007, the entire contents of which are incorporated herein by reference.

The invention relates to a process for depolymerizing mixtures comprising mono- and/or diesters of polytetrahydrofuran in the presence of an acidic catalyst and of a $C_1$- to $C_3$-alcohol at temperatures of from 80 to 200° C. and a pressure of from 0.05 to 0.5 MPa, where the molar ratio of the $C_1$- to $C_3$-alcohol relative to the carboxyl groups present in the mixture is greater than 1.

Polytetrahydrofuran—referred to hereinafter as PTHF—which is also known as polyoxybutylene glycol, is used as a versatile intermediate in the plastics and synthetic fiber industry and serves, inter alia, to prepare polyurethane, polyester and polyamide elastomers. In addition, like some of its derivatives too, it is a valuable assistant in many fields of application, for example as a dispersant or in the deinking of used paper.

PTHF is prepared industrially by polymerizing tetrahydrofuran—referred to hereinafter as THF for short—over suitable catalysts. Addition of suitable reagents allows the chain length of the polymer chains to be controlled and the mean molecular weight thus to be adjusted to the desired value. The control is effected through selection of type and amount of the telogen. Such reagents are referred to as chain termination reagents or "telogens". The selection of suitable telogens additionally allows functional groups to be introduced at one end or both ends of the polymer chain.

On the industrial scale, very predominantly two-stage processes are performed, in which tetrahydrofuran is polymerized, for example in the presence of fluorosulfonic acid, to give polytetrahydrofuran esters, and then hydrolyzed to polytetrahydrofuran.

Especially advantageous is THF polymerization or THF copolymerization in the presence of $C_2$- to $C_{12}$-carboxylic anhydrides or mixtures thereof with $C_2$- to $C_{12}$-carboxylic acids, for example acetic anhydride or acetic anhydride-acetic acid mixtures, in the presence of acidic catalysts to give mono- and/or diesters of PTHF, and subsequent base-catalyzed transesterification of the PTHF esters or esters of THF copolymers with methanol to give PTHF or THF copolymers (with terminal hydroxyl groups).

Transesterification processes for PTHF esters are described, for example, in EP-A 38 009 and DE-A 28 01 578.

PTHF esters which do not have the desired target molecular weight or do not satisfy the requirements for further processing to PTHF for other reasons, for example owing to excessively high viscosity, excessively broad molar mass distribution, excessively high color number or owing to impurities, can be utilized by converting them by depolymerization back to THF, which can be purified and returned back to the process as a reactant. For example, according to the process known from JP-A-11-269262, PTHF esters of low molar mass are initially separated by distillation from the PTHF ester of the desired molecular weight and then hydrolyzed and depolymerized, while PTHF esters of the desired molecular weight are transesterified to the PTHF end product. Under the conditions of the depolymerization described, the acid released from the depolymerized ester may, however, have corrosive action or deactivate the catalyst.

It is an object of the present invention to provide an economically viable process for depolymerizing mixtures of mono- and/or diesters of polytetrahydrofuran which may comprise low molecular weight linear or cyclic oligomers of polytetrahydrofuran, in which a catalyst with good lifetime and yield is used, and readily removable, noncorrosive by-products which do not have catalyst-deactivating action are formed.

It has now been found that, surprisingly, a process for depolymerizing mixtures comprising mono- and/or diesters of polytetrahydrofuran in the presence of an acidic catalyst and of a $C_1$- to $C_3$-alcohol at temperatures of from 80 to 200° C. and a pressure of from 0.05 to 0.5 MPa, where the molar ratio of the $C_1$- to $C_3$-alcohol relative to the carboxyl groups present in the mixture is greater than 1, achieves this object.

The process according to the invention prevents the release of acetic acid, as occurs in the prior art processes. Instead, a readily removable acetic ester, preferably methyl acetate, is formed. Methyl acetate can be converted by carbonylation in a direct and economically viable manner back to acetic anhydride, which can flow back into the PTHF preparation process.

Useful catalysts are especially those acidic catalysts which are also capable of catalyzing the polymerization.

These include, for example, catalysts based on acidic aluminas or bleaching earths, as described, for example, in DE-A 1 226 560. Bleaching earths, especially also activated montmorillonites, can be used as shaped bodies in a fixed bed or in a suspension.

Heteropolyacids which can likewise be used in accordance with the invention are inorganic polyacids which, unlike isopolyacids, have at least two different central atoms. Heteropolyacids are formed from in each case weak polybasic oxygen acids of a metal, such as chromium, molybdenum, vanadium and tungsten, and of a nonmetal such as arsenic, iodine, phosphorus, selenium, silicon, boron and tellurium, as partial mixed anhydrides. Examples include dodecatungstophosphoric acid $H_3(PW_{12}O_{40})$ or decamolybdophosphoric acid $H_3(PMo_{12}O_{40})$. The heteropolyacids may, as a second central atom, also comprise actinoids or lanthanoids (Z. Chemie 17 (1977), pages 353 to 357 and 19 (1979), 308). The heteropolyacids can generally be described by the formula $H_{8-n}(Y''M_{19}O_{40})$ where n=valency of the element Y (e.g. boron, silicon, zinc) (see also Heteropoly- and Isopolyoxometalates, Berlin; Springer 1983). For the process according to the invention, particularly suitable catalysts are phosphotungstic acid, phosphomolybdic acid, silicomolybdic acid and silicotungstic acid.

The heteropolyacids used as catalysts may be used in the depolymerization either in dried form (from 1 to 10 mol of water/mole of heteropolyacid) or undried form (from 10 to 40 mol of water/mol of heteropolyacid).

In addition, catalysts based on mixed metal oxides are suitable for the depolymerization to THF. For instance, JP-A 04-306 228 describes mixed metal oxides consisting of metal oxides of the formula MA where x and y are integers in the range of 1-3. Examples mentioned are $Al_2O_3$—$SiO_2$, $SiO_2$—$TiO_2$, $SiO_2$—$ZrO_2$ and $TiO_2$—$ZrO_2$.

U.S. Pat. No. 5,208,385 discloses catalysts based on amorphous silicon/aluminum mixed oxides. Mixed oxides based on $SnO_2/SiO_2$, $Ga_2O_3/SiO_2$, $Fe_2O_3/SiO_2$, $In_2O_3/SiO_2$, $Ta_2O_5/SiO_2$ and $HfO_2/SiO_2$ are also known. The aforementioned catalysts are preferably prepared by coprecipitation/sol-gel methods. Supported catalysts are disclosed in DE-A 44 33 606, wherein tungsten oxides or molybdenum oxides are applied to, for example, $ZrO_2$, $TiO_2$, $HfO_2$, $Y_2O_3$, $Fe_2O_3$, $Al_2O_3$, $SnO_2$, $SiO_2$ or $ZnO$. Additionally recommended are $ZrO_2/SiO_2$ catalysts in which the support has an alkali metal concentration of <5000 ppm.

All solid catalysts cited can in principle be used in extrudate form or else in suspension. Heteropolyacids may be used in liquid form.

Catalysts based on acidic ion exchangers are described in U.S. Pat. No. 4,120,903, especially polymers comprising alpha-fluorosulfonic acid (for example Nafion®). Additionally suitable are catalysts which comprise a metal and perfluoroalkyl sulfonic acid anions.

Additionally known as depolymerization catalysts are also further activated and unactivated clay minerals, disclosed, for example, in WO 94/05719, WO 96/23833, WO 98/51729, WO 99/12992 and DE-A 195 134 93. Zeolites are also suitable as catalysts and are described, for example, in DE-A 43 16 138; it is equally possible to use acidic silicates, for example based on halloysite, as disclosed in U.S. Pat. No. 6,207,793. Finally, sulfated zirconium oxides, sulfated aluminum oxides, supported heteropolyacids and supported ammonium bifluoride ($NH_4F*HF$) or antimony pentafluoride are also known as suitable depolymerization catalysts.

Preference is given to performing the process according to the invention with activated bleaching earths.

Possible pretreatments of the catalyst include, for example, drying with gases heated to from 80 to 200° C., preferably to from 100 to 180° C., for example air or nitrogen. The inventive depolymerization is performed in the presence of an acidic catalyst at temperatures of from 80 to 200° C., preferably from 90 to 180° C., more preferably from 100 to 160° C., and a pressure of from 0.05 to 1.0 MPa, preferably from 0.075 to 0.5 MPa, more preferably from 0.09 to 0.25 MPa, with an at least molar excess of a $C_1$- to $C_3$-alcohol, based on the carboxyl groups present in the mixture.

The concentration of the carboxyl groups present in the starting mixture, i.e. the ester and carboxylic acid groups, is determined by wet chemical means by determining the acid or ester number.

The $C_1$- to $C_3$-alcohol used is preferably methanol, since the methyl acetate formed therefrom not only can be removed easily from the depolymerization mixture and from the THF likewise formed and is not corrosive, but can also be converted back to the acetic anhydride required for the polymerization in an economically viable manner.

The $C_1$- to $C_3$-alcohol, preferably methanol, is used preferably in a molar ratio of from 1.5:1 to 20:1, more preferably in a molar excess of from 3:1 to 12:1, relative to the carboxyl groups present in the mixture of the mono- and/or diesters of polytetrahydrofuran.

The starting material is a mixture of mono- and/or diesters of polytetrahydrofuran which, for the reasons described above, is not suitable for further processing to PTHF and, without taking account of the $C_1$-$C_3$ alcohol to be added in accordance with the invention, has between 0.1 and 100% by weight of mono- and/or diesters of polytetrahydrofuran. The starting material can be prepared by processes known per se, for example by the process described in DE-A 28 01 578, by THF polymerization or THF copolymerization in the presence of $C_2$- to $C_{12}$-carboxylic anhydrides or mixtures thereof with $C_2$- to $C_{12}$-carboxylic acids. Low molecular weight oligomers can be removed, for example, by evaporation under reduced pressure as described in JP 11-269262. For the process according to the invention, it is possible to use low molecular weight oligomers, but also PTHF diesters from the product stream of the polymerization, for example according to DE-A 28 01 578. The depolymerization of the PTHF diesters from the product stream may be necessary when the esters do not meet the product specifications. This off-spec product may be formed, for example, during a molar mass changeover of the production plant, in the event of impurities or in the event of operating faults. It is likewise possible in the inventive process to use esters of PTHF which have been prepared by esterifying the PTHF by commonly known methods, for example according to Organikum, Johann Ambrosius Barth Verlag, Heidelberg, 20th edition, 1996, p. 444.

In the preparation process by THF polymerization or THF copolymerization in the presence of $C_2$- to $C_{12}$-carboxylic anhydrides or mixtures thereof with $C_2$- to $C_{12}$-carboxylic acids, in a first step, a mono- and/or diester of PTHF or of the THF copolymers is prepared by polymerization of THF in the presence of telogens and if appropriate comonomers over acidic, preferably heterogeneous catalysts, as specified above for the depolymerization. Preference is given to using bleaching earth.

The polymerization is performed generally at temperatures of from 0 to 80° C., preferably from 10° C. up to the boiling point of the THF. The pressure employed is generally not critical for the result of the polymerization, which is why atmospheric pressure or the autogenous pressure of the polymerization system is generally employed.

To prevent the formation of ether peroxides, the polymerization is advantageously undertaken under an inert gas atmosphere. The inert gases used may, for example, be nitrogen, carbon dioxide or the noble gases; preference is given to using nitrogen. The process can be operated batchwise or continuously, but is preferably operated continuously for economic reasons.

Since the telogen leads to chain termination, the mean molecular weight of the polymer to be prepared can be controlled via the amount of telogen used. Suitable telogens are carboxylic anhydrides and/or carboxylic acids in the preparation of mono- and diesters of PTHF. Preference is given to using organic carboxylic acids or anhydrides thereof. Among these are aliphatic and aromatic poly- and/or monocarboxylic acids which comprise from 2 to 12, preferably from 2 to 8 carbon atoms. Preferred examples of aliphatic carboxylic acids are acetic acid, acrylic acid, lactic acid, propionic acid, valeric acid, caproic acid, caprylic acid and pelargonic acid, of which acetic acid is preferred. Examples of aromatic carboxylic acids are phthalic acid and naphthalenecarboxylic acid. Examples of anhydrides of aliphatic polycarboxylic acids are acrylic anhydride, succinic anhydride and maleic anhydride. Acetic anhydride is especially preferred.

The concentration of the carboxylic anhydride used as a telogen in the reactant mixture (feed) fed to the polymerization reactor is between 0.03 and 30 mol %, preferably from 0.05 to 20 mol %, more preferably from 0.1 to 10 mol %, based on the THF used. When a carboxylic acid is used additionally, the molar ratio in the feed to the running polymerization is typically from 1:20 to 1:20 000, based on carboxylic anhydride used.

The mono- and diesters of the THF copolymers can be prepared by the additional use of cyclic ethers as comonomers which can be polymerized by a ring-opening mechanism, preferably three-, four- and five-membered rings, such as 1,2-alkylene oxides, e.g. ethylene oxide or propylene oxide, oxetane, substituted oxetanes such as 3,3-dimethyloxetane, the THF derivatives 2-methyltetrahydrofuran or 3-methyltetrahydrofuran, particular preference being given to 2-methyltetrahydrofuran or 3-methyltetrahydrofuran.

It is equally possible to use $C_2$- to $C_{12}$-diols as comonomers. These may, for example, be ethylene glycol, propylene glycol, butylene glycol, 1,3-propanediol, 2-butyne-1,4-diol, 1,6-hexanediol or low molecular weight PTHF. Additionally suitable as comonomers are cyclic ethers such as 1,2-alkylene oxides, for example ethylene oxide or propylene oxide, 2-methyltetrahydrofuran or 3-methyltetrahydrofuran.

According to the telogen content of the polymerization mixture, it is possible by the process to prepare mono- and/or diesters of PTHF or of the THF copolymers with mean molecular weighs of from 250 to 10 000 daltons in a controlled manner; preference is given to preparing, by the process according to the invention, the PTHF esters in question with mean molecular weights of from 500 to 5000 daltons, more preferably from 650 to 4000 daltons. The term "mean molecular weight" or "mean molar mass" is understood in this application to mean the number-average molecular weight $M_n$ of the polymers, which is determined by wet-chemical OH number determination.

After the polymerization, the esters of polytetrahydrofuran having the target molecular weight and the mono- and/or diesters of polytetrahydrofuran which do not have the desired molecular weight are separated by a separating process known per se.

It is particularly advantageous that, in the process according to the invention, the presence of other components which can form in the PTHF production process is tolerated. In addition to PTHF diesters, the mixture usable in accordance with the invention may comprise the mono- and/or diester of PTHF (polytetrahydrofuran, diol form), cyclic THF oligomers, 1,4-butanediol, mono-/diesters of 1,4-butanediol, THF, carboxylic acids (e.g. acetic acid), carboxylic anhydrides (e.g. acetic anhydride) and water.

The starting material, which comprises mixtures of mono- and/or diesters of polytetrahydrofuran having a molecular weight not corresponding to the target molecular weight of the polymerization, may additionally comprise linear or cyclic oligomers of polytetrahydrofuran.

The cyclic oligomers may, for example, be compounds of the following formulae:

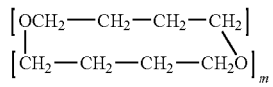

where m=1, 2, 3, 4, 5, 6, 7

These oligomers are generally removed in a separate step after the transesterification of the polytetrahydrofuran esters to PTHF and depolymerized to THF. In order to maintain the economic viability of the overall process for preparing PTHF, the THF thus obtained can be fed back to the polymerization. They can be depolymerized as part of the mixture of mono- and/or diesters of polytetrahydrofuran having a molecular weight not corresponding to the target molecular weight of the polymerization.

The invention is illustrated in detail hereinafter with reference to examples.

EXAMPLES

Determination of the Ester Number and Acid Number

The ester content and carboxylic acid content of the starting materials (the carboxyl groups present in the mixture) were determined by determining the "ester number" and the "acid number" by methods known to those skilled in the art. To determine the acid number, all carboxylic acids present were neutralized with an excess of potassium hydroxide and the remaining amount of potassium hydroxide was determined by volumetric titration with hydrochloric acid. To determine the hydrolysis number, all esters present were hydrolyzed with an excess of ethanolic potassium hydroxide. The remaining amount of potassium hydroxide was determined by volumetric titration with hydrochloric acid. The ester number is calculated from the difference of the hydrolysis number thus determined and the acid number determined beforehand. The ester number is understood to mean that amount of potassium hydroxide in mg which is equivalent to the amount of acetic acid bound in the acetylation of 1 g of substance.

Determination of the OH Number

The content of hydroxyl groups was determined as a determination of the "OH number" by methods known to those skilled in the art. To this end, all OH groups were reacted with an excess of acetylation reagent (acetic anhydride), and the excess acid equivalents were determined by volumetric titration with potassium hydroxide solution. The OH number is understood to mean that amount of potassium hydroxide in mg which is equivalent to the amount of acetic acid formed in the acetylation of 1 g of substance.

The mean molar mass of PTHF diol and PTHF diesters can be determined by the following formula from the OH number and from the ester number respectively:

$$\text{molar mass (diol)} = 2000 \times 56.11 / \text{OH number}$$

$$\text{molar mass (diester)} = 2000 \times 56.11 / \text{ester number}$$

Karl Fischer Determination of Water Content

The determination of the water content was performed by Karl-Fischer titration. To this end, from 1 to 3 ml of the sample solution were injected into an automatic system for determining the water content by the Karl-Fischer method (Metrohm Karl Fischer Coulometer KF756). The measurement was effected by a coulometric route and is based on the Karl-Fischer reaction, the water-mediated reaction of iodine with sulfur dioxide.

Analysis

The volatile reaction effluents (distillate), THF, methyl acetate, methanol and acetic acid were analyzed by gas chromatography. To this end, the mixtures were admixed with a defined amount of an internal standard (diethylene glycol dimethyl ether) and injected undiluted into the GC chromatograph (from HP, carrier gas: hydrogen) onto a 30 m DB1 column (from J+W) and analyzed at oven temperatures of from 60° C. to 300° C. (heating rate 8 kelvin per minute up to 220° C., then 20 kelvin per minute up to 300° C.) with a flame ionization detector (temperature: 290° C.). The composition was determined by integrating the signals of the chromatogram. The conversion of the signal intensity to the proportions by mass was carried out with reference to a calibration performed beforehand with the internal standard (diethylene glycol dimethyl ether).

Example 1

A 1 l multineck flask with stirrer, attached feed line and distillation column (30 cm, filled with 6×6 mm wire mesh rings) was initially charged with 35 g of bleaching earth (K10 powder from Süd-Chemie). Subsequently, the flask was filled with 700 ml of a feed solution which had the following composition:

21% by weight of PTHF oligomers (mean molar mass Mn=250)
21% by weight of PTHF acetic esters (mean molar mass Mn=355)
2.6% by weight of acetic acid
30% by weight of THF
24% by weight of methanol
1.2% by weight of water According to the method described above, the content of carboxyl functions present (ester, acid) was determined to be $1.6 \cdot 10^{-3}$ mol/g. With regard to the methanol added, this corresponded to a molar excess of 4.7:1, based on the carboxyl groups present in the mixture.

The mixture was heated to boiling. As soon as distillation set in, 30 g/h of the above-described feed mixture were conveyed into the apparatus with the aid of a feed pump. A constant liquid level in the flask was established by means of the heating. The distillates which distilled over were analyzed by gas chromatography. After 100 operating hours, the following constant operating parameters and effluent compositions were found:
oil bath temperature: 136° C.
bottom temperature: 135° C.
top temperature on distillation column: 61° C.
amount of distillate per hour: 30 g The composition of the distillate was determined by gas chromatography and titrimetry (water content determination) to be 9.9% by weight of methanol; 11.5% by weight of methyl acetate; 62.8% by weight of THF; 4.8% by weight of water, <0.1% by weight of acetic acid, 11.9% by weight of unidentified components.

Example 2

A 2 l multineck flask with stirrer, attached feed line and distillation column (30 cm, filled with 6×6 mm wire mesh rings) was initially charged with 5 g of heteropolyacid (tungstophosphoric acid hydrate, CAS No. 12501-23-4, commercial product from Sigma-Aldrich), which were dried at 150° C. under reduced pressure for 12 h. Subsequently, the flask was filled with 1020 g of a feed solution which had the following composition:
  25% by weight of PTHF oligomers (mean molar mass Mn=1000)
  27% by weight of PTHF acetic esters (mean molar mass Mn=1100)
  27% by weight of THF
  20% by weight of methanol
  1% by weight of water According to the method described above, the proportion of carboxyl groups present (esters) was determined to be $5 \cdot 10^{-4}$ mol/g. With regard to the methanol added, this corresponded to a molar excess of 12:1 based on the carboxyl groups present in the mixture.

The mixture was heated to boiling. As soon as distillation set in, 20 g/h of the above-described feed mixture were conveyed into the apparatus with the aid of a feed pump.

A constant liquid level in the flask was established by means of the heating. The distillates which distilled over were analyzed by gas chromatography. After 5 operating hours, the following operating parameters and effluent compositions were found:
top temperature on distillation column: 63° C.
amount of distallate per hour: 20 g The composition of the distillate was determined by gas chromatography and titrimetry (water content determination) to be 16% by weight of methanol; 3% by weight of methyl acetate; 71% by weight of THF; 4% by weight of water, <0.1% by weight of acetic acid, 6% by weight of unidentified components.

The invention claimed is:

1. A process for depolymerizing mixtures comprising mono- and/or diesters of polytetrahydrofuran in the presence of an acidic catalyst and of a $C_1$- to $C_3$-alcohol at temperatures of from 80 to 200° C. and a pressure of from 0.05 to 0.5 MPa, where the molar ratio of the $C_1$- to $C_3$-alcohol relative to the carboxyl groups present in the mixture is greater than 1.

2. The process according to claim 1, wherein methanol is used.

3. The process according to claim 1, wherein methanol is used in a molar amount of from 1.5:1 to 20:1, based on the carboxyl groups present in the mixture.

4. The process according to claim 1, wherein a solid acidic catalyst selected from acidic silicates, acidic alumina, bleaching earth, sulfated zinc oxide, sulfated zirconium dioxide, sulfated aluminum oxide, sulfated tungsten zirconium dioxide, heteropolyacids, zeolites and acidic ion exchangers is used.

5. The process according to claim 1, wherein bleaching earth is used as a catalyst.

6. The process according to claim 1, wherein depolymerization and transesterification are effected at temperatures of from 100 to 160° C. and a pressure of from 0.075 to 0.5 MPa.

7. The process according to claim 1, wherein the mixture comprises low molecular weight linear and/or cyclic oligomers of polytetrahydrofuran.

8. The process according to claim 1, wherein the mixture comprises THF.

9. The process according to claim 1, wherein the mixture comprises water.

10. The process according to claim 2, wherein methanol is used in a molar amount of from 1.5:1 to 20:1, based on the carboxyl groups present in the mixture.

11. The process according to claim 2, wherein a solid acidic catalyst selected from acidic silicates, acidic alumina, bleaching earth, sulfated zinc oxide, sulfated zirconium dioxide, sulfated aluminum oxide, sulfated tungsten zirconium dioxide, heteropolyacids, zeolites and acidic ion exchangers is used.

12. The process according to claim 3, wherein a solid acidic catalyst selected from acidic silicates, acidic alumina, bleaching earth, sulfated zinc oxide, sulfated zirconium dioxide, sulfated aluminum oxide, sulfated tungsten zirconium dioxide, heteropolyacids, zeolites and acidic ion exchangers is used.

13. The process according to claim 2, wherein bleaching earth is used as a catalyst.

14. The process according to claim 3, wherein bleaching earth is used as a catalyst.

15. The process according to claim 4, wherein bleaching earth is used as a catalyst.

16. The process according to claim 2, wherein depolymerization and transesterification are effected at temperatures of from 100 to 160° C. and a pressure of from 0.075 to 0.5 MPa.

17. The process according to claim 3, wherein depolymerization and transesterification are effected at temperatures of from 100 to 160° C. and a pressure of from 0.075 to 0.5 MPa.

18. The process according to claim 4, wherein depolymerization and transesterification are effected at temperatures of from 100 to 160° C. and a pressure of from 0.075 to 0.5 MPa.

19. The process according to claim 5, wherein depolymerization and transesterification are effected at temperatures of from 100 to 160° C. and a pressure of from 0.075 to 0.5 MPa.

20. The process according to claim 2, wherein the mixture comprises low molecular weight linear and/or cyclic oligomers of polytetrahydrofuran.

* * * * *